Oct. 4, 1932.　　　　J. J. WALLACE　　　　1,881,003
LATCH FOR COTTON FEEDER CHUTES
Filed Feb. 10, 1931　　　2 Sheets-Sheet 1
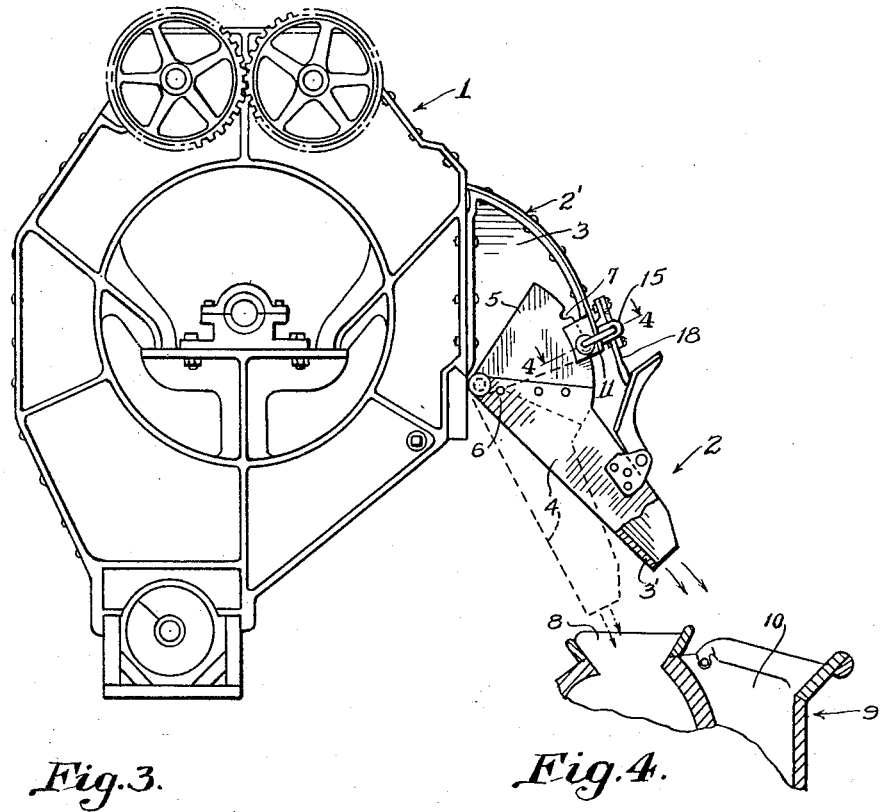
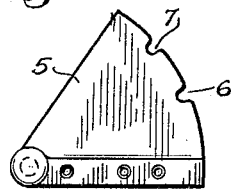
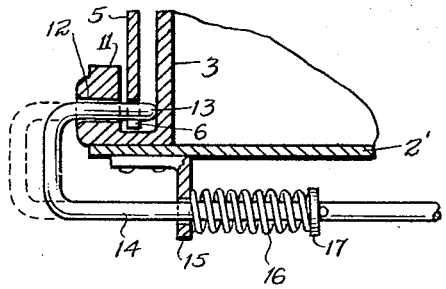
Inventor
Jeffrey J. Wallace
By Mason Fenwick＆Lawrence
Attorneys Oct. 4, 1932.                J. J. WALLACE                1,881,003
                    LATCH FOR COTTON FEEDER CHUTES
                Filed Feb. 10, 1931        2 Sheets-Sheet 2
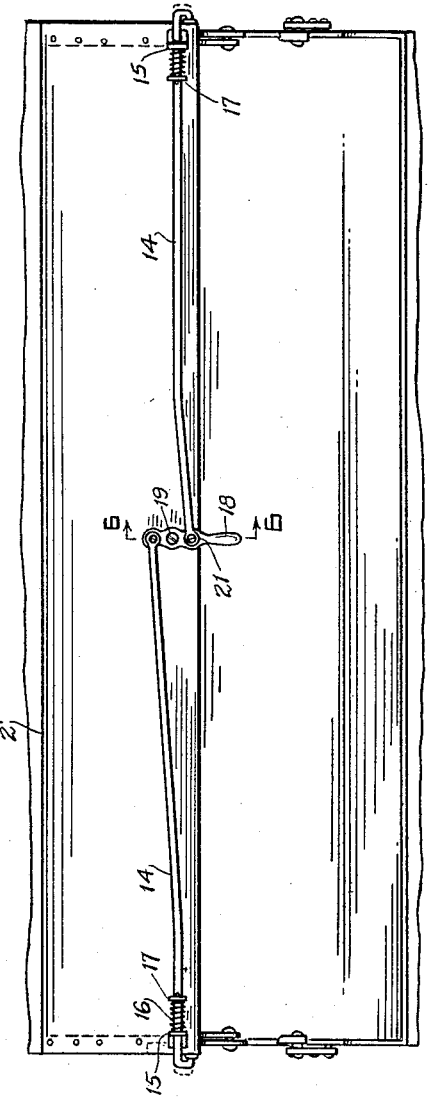
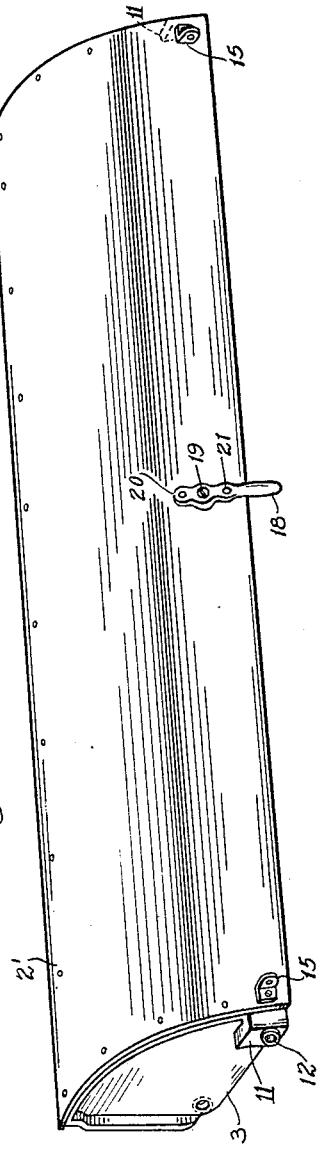
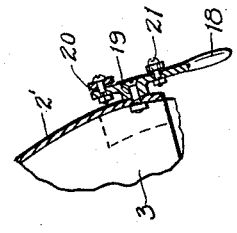
Inventor
Jeffrey J. Wallace
By Mason Fenwick Lawrence
Attorneys Patented Oct. 4, 1932

1,881,003

UNITED STATES PATENT OFFICE

JEFFREY JOHN WALLACE, OF AMITE, LOUISIANA, ASSIGNOR TO GULLETT GIN COMPANY, OF AMITE, LOUISIANA

LATCH FOR COTTON FEEDER CHUTES

Application filed February 10, 1931. Serial No. 514,887.

The invention forming the subject matter of this application is an adjustable chute adapted for use in a huller gin to deliver seed cotton from the gin feeder either to the huller roll box, or to the ginning roll box, as may be desired.

The object of the invention is to provide mechanism for locking the adjustable chute in any of its adjusted positions by locking mechanism which is extremely simple, positive in action, and very easy to operate.

Other objects of the invention will become apparent as the detailed description thereof proceeds.

In the drawings:

Figure 1 is an end elevation of the upper part of a gin feeder, and the upper part of a gin, with a chute interposed between the two members.

Figure 2 is a fragmentary side elevation of the hood of the gin feeder, and of the chute which is pivotally connected to the lower end of said chute.

Figure 3 is a side elevation of a plate forming part of each end of the chute and provided with notches in the edge thereof to determine the position of adjustment of the said chute.

Figure 4 is a section, to an enlarged scale, taken on the line 4—4 of Figure 1.

Figure 5 is a perspective of the hood leading from the gin feeder to the aforesaid chute; and Figure 6 is a section to an enlarged scale taken on the line 6—6 of Figure 2.

As shown in the drawings, a gin feeder, designated generally by the reference numeral 1 has a hood 2' suitably secured to the outlet thereof. The hood 2' is provided with end walls 3, only one of which is shown in the drawings. The hood 2' is arcuate and extends substantially through an angle of 90°. At the lower end of this hood and at the point where this lower end connects to the feeder 1, the chute 2 is pivotally connected by any suitable pivot bolts or rivets.

The chute 2 comprises a bottom plate 3' extending transversely across the hood and slightly beyond the ends thereof. The chute plate 3' is provided at each end with side walls 4, only one of which is shown in the drawings, extending perpendicularly to said plate 3'. The upper end of each side wall has an arcuate plate 5 fixedly secured thereto as by rivets 6, although this plate may be made integral with the side 4. The arcuate edge of the plate 5 is provided with two notches 6 and 7 adapted to cooperate with locking mechanism to be described hereafter for securing the chute in either of two adjusted positions.

The chute 2 in its lowermost position indicated by dotted lines in Figure 1 feeds into a ginning roll box 8 of a huller gin 9. In its upper position and as shown in Figure 1 the chute feeds into a huller roll box 10.

In order to lock the chute 2 in either of its adjusted positions, the end walls 3 are provided with lugs 11, only one of which appears in the drawings. These lugs are offset from walls 3 to provide a passage way for plate 5 and are each provided with an aperture 12 adapted to receive slidably the inturned end 13 of a bolt 14 which is slidably mounted in a bracket 15 secured to the outer face of the hood 2 near the lower end thereof.

The inturned end 13 is slidably mounted in aperture 12 and has its inward movement therein limited by contact with the end wall 3. The inturned end 13 is adapted to fit snugly in either of the notches 6 and 7 of the plate 5 and thereby hold the chute 2 in the corresponding adjusted position. The inturned end 13 is normally held in the path of rotation of the plate 5 by means of a coil spring 16 which surrounds the bolt 14 and is interposed between the bracket 15 and a washer 17 suitably secured to the bolt 14.

The bolt mechanism at the other end of the hood is identical with that just disclosed, and the parts thereof are identified by the same reference numerals. In order to operate both of the bolts simultaneously, a handle member 18 is pivotally mounted, as by pivot 19, upon the lower edge of the outer face of the hood 2'. One of the bolts 14 is pivotally connected to a projecting lug 20 of the handle 18 while the other bolt is connected by a pivot 21 to the handle 18 at the side of the pivot 19 opposite to the pivotal connection 20.

It will be obvious from inspection of Figure 2 of the drawings that the bolts 14 are normally held by the spring 16 in locking position against the sides of the arcuate plates 5. In order to release the chute from locked position, it is only necessary to rotate the handle 18 anticlockwise as shown in Figure 2 to spread the bolts 14 apart from each other and release them from locking engagement with the notched plates on the ends of the chute. As soon as the handle 18 is released, the bolts 14 are caused to move toward each other by the springs 16 and to seat the inturned ends 13 in either of the notches 6 and 7 as soon as either notch becomes aligned with the ends 13.

What I claim is:

1. A cotton feeder having a hood extending horizontally from and over the discharge end thereof, a lug extending inwardly toward the feeder from each end of said hood, a chute pivoted to said hood at the intersection of said hood with the lower edge of the discharge aperture of said feeder and adapted to swing toward and from said hood, said chute having an arcuate end plate provided with notches in the edge thereof, and means slidably mounted on said hood adapted to engage any of said notches to hold the chute in adjusted position relative to the discharge end of said hood.

2. A cotton feeder having a hood extending horizontally from and over the discharge end thereof, a lug extending inwardly toward the feeder from each end of said hood, a chute pivoted to said hood at the intersection of said hood with the lower edge of the discharge aperture of said feeder and adapted to be swung toward and from the hood, and a bolt slidable in said lug to engage the ends of said chute and hold the chute in adjusted position relative to said hood.

3. A cotton feeder having a hood fixed rigidly thereto extending horizontally from and over the discharge end thereof, a chute pivotally connected to said hood at the intersection of said hood with the lower edge of the discharge aperture of said feeder and adapted to swing toward and from the lower end of said hood, and cooperative locking mechanism on said hood and chute for locking the chute in any desired position of adjustment relative to said hood.

4. A cotton feeder having a hood extending over the discharge end thereof, a chute pivotally connected to said feeder below said discharge end and adapted to swing toward and from the lower end of said hood, bolts slidably mounted on the lower end of said hood and having inturned ends projecting over the opposite ends of said hood, plates on said chute having notches formed in the edges thereof and adapted to receive the inturned ends of said bolts, means on said hood for moving said inturned ends into said notches, and means for moving said bolts to release the notches from said inturned ends.

5. A cotton feeder having a hood extending over the discharge end thereof, a chute pivotally connected to said feeder below said discharge end and adapted to swing toward and from the lower end of said hood, bolts slidably mounted on the lower end of said hood and having inturned ends projecting around the opposite ends of said hood, plates on said chute having notches formed in the edges thereof to receive said inturned ends, and means on said hood for moving said bolts in opposite direction to move said inturned end into and out of said notches.

6. A cotton feeder having a hood extending over the discharge end thereof, a chute pivotally connected to said feeder below said discharge end and adapted to swing toward and from the lower end of said hood, bolts slidably mounted on the lower end of said hood and having inturned ends projecting around the opposite ends of said hood, plates on said chute having notches formed in the edges thereof to receive said inturned ends, a handle pivotally mounted on said hood and pivotally connected to said bolts on opposite sides of the pivotal connection to said hood, and springs mounted on said hood for forcing the bolts toward each other to cause engagement between said inturned ends and said notches.

7. A cotton feeder having a hood extending over the discharge end thereof, a chute pivotally connected to said feeder below said discharge end and adapted to swing toward and from the lower end of said hood, brackets secured to said hood near the opposite ends thereof, bolts slidably mounted in said brackets and having inturned ends projecting around the opposite ends of said hood, plates on said chute having notches formed in the edges thereof to receive said inturned ends, means engaging said brackets and bolts for normally forcing said inturned ends into said notches, and means pivotally connected to said hood and to said bolts for moving the bolts toward each other to disengage said inturned ends from said notches.

8. A cotton feeder having a hood extending over the discharge end thereof, a chute pivotally connected to said feeder below said discharge end and adapted to swing toward and from the lower end of said hood, brackets secured to said hood near the opposite ends thereof, bolts slidably mounted in said brackets and having inturned ends projecting around the opposite ends of said hood, plates on said chute having notches formed in the edges thereof to receive said inturned ends, means engaging said brackets and bolts for normally forcing said inturned ends into said notches, a handle pivoted to said hood, and pivotally connected to the adjacent ends of said bolts on opposite sides of the pivotal connection to the hood for forcing said bolts away from each other to release the inturned ends from said notches.

9. A cotton feeder having a hood extending horizontally from and over the discharge end thereof, a chute pivotally connected to said hood at the intersection of said hood with the lower edge of the discharge aperture of said feeder and adapted to swing toward and from the lower end of said hood, a handle rotatably mounted on said hood near the lower edge thereof, and mechanism controlled by the rotation of said handle and engageable with said chute for locking the chute in adjusted position relative to said hood.

In testimony whereof I affix my signature.

JEFFREY JOHN WALLACE.